US010392263B1

(12) United States Patent
Dwivedi et al.

(10) Patent No.: US 10,392,263 B1
(45) Date of Patent: Aug. 27, 2019

(54) MODIFICATION OF PIGMENTS USING ATOMIC LAYER DEPOSITION (ALD) IN VARYING ELECTRICAL RESISTIVITY

(71) Applicant: The United States of America as represented by the Administrator of NASA, Washington, DC (US)

(72) Inventors: Vivek H Dwivedi, Glenn Dale, MD (US); Mark M. Hasegawa, Highland, MD (US)

(73) Assignee: United States of America as represented by the Adminstrator of NASA, Washington, DC (US)

( * ) Notice: Subject to any disclaimer, the term of this patent is extended or adjusted under 35 U.S.C. 154(b) by 0 days.

(21) Appl. No.: 15/875,092

(22) Filed: Jan. 19, 2018

(51) Int. Cl.
*C01G 19/02* (2006.01)
*C01G 25/02* (2006.01)
*C09C 1/00* (2006.01)
*C09C 3/06* (2006.01)

(52) U.S. Cl.
CPC ............. *C01G 25/02* (2013.01); *C01G 19/02* (2013.01); *C09C 1/0015* (2013.01); *C09C 3/063* (2013.01); *C09C 2220/20* (2013.01)

(58) Field of Classification Search
CPC ...... C01G 19/02; C01G 25/02; C02C 1/0015; C02C 3/063; C23C 16/40; C09C 1/0015; C09C 3/063
See application file for complete search history.

(56) References Cited

U.S. PATENT DOCUMENTS 4,940,523 A * 7/1990 Takeshima ................ B22F 1/02 204/192.12
5,238,492 A * 8/1993 Itoh ........................ B82Y 30/00 106/436
5,351,617 A * 10/1994 Williams ............. B41C 1/1033 101/453
5,385,092 A * 1/1995 Lewis .................. B41C 1/1033 101/453
5,877,895 A * 3/1999 Shaw ..................... G02B 5/287 359/585
7,351,449 B2 * 4/2008 Hunt ..................... C23C 16/453 427/223
2003/0185591 A1 * 10/2003 Furukawa ................ G03G 5/10 399/159

(Continued)

FOREIGN PATENT DOCUMENTS

WO WO 00/24926 * 5/2000 ............. C23C 14/00

OTHER PUBLICATIONS

Katsui, Hirokazu, et al., "Coatings on ceramic powders by rotary chemical vapor deposition and sintering of the coated powders". Journal of the Ceramic Society of Japan 126 (6) 413-420 2018.*

(Continued)

*Primary Examiner* — Bret P Chen
(74) *Attorney, Agent, or Firm* — Matthew F. Johnston; Bryan A. Geurts; Mark P. Dvorscak

(57) ABSTRACT

A method of producing a modification of pigments using atomic layer deposition (ALD) in varying electrical resistivity. More specifically, ALD may be used to encapsulate pigment particles with controlled thicknesses of a conductive layer, such as indium tin oxide (ITO). ALD may allow films to be theoretically grown one atom at a time, providing angstrom-level thickness control.

19 Claims, 3 Drawing Sheets

(56) References Cited

U.S. PATENT DOCUMENTS

| | | | | |
|---|---|---|---|---|
| 2009/0286665 | A1* | 11/2009 | Szuscik-Machnicki ..................... | B22F 1/0055 501/20 |
| 2014/0335329 | A1* | 11/2014 | Abayasinghe .......... | B32B 27/12 428/212 |
| 2015/0361553 | A1* | 12/2015 | Murakawa .......... | C23C 16/4412 156/345.55 |
| 2017/0186754 | A1* | 6/2017 | Blomberg ......... | H01L 21/02538 |
| 2017/0340530 | A1* | 11/2017 | Bevacqua ............ | A61K 8/0245 |

OTHER PUBLICATIONS

Katta, P., et al., "Continuous Electrospinning of Aligned Polymer Nanofibers onto a Wire Drum Collector". Nano Letters 2004 vol. 4, No. 11, 2215-2218.*

Choy, K.L., et al., "Chemical vapour deposition of coatings". Progress in Materials Science 48 (2003) 57-170.*

Haubner, R., et al., "Coating of ceramic powders by chemical vapor deposition techniques (CVD)". Workshop on Metal/Ceramic Compositions for Functional Application, Jun. 5-6, 1997, Vienna, Austria, pp. 309-321.*

* cited by examiner

MODIFICATION OF PIGMENTS USING ATOMIC LAYER DEPOSITION (ALD) IN VARYING ELECTRICAL RESISTIVITY

STATEMENT OF FEDERAL RIGHTS

The invention described herein was made by employees of the United States Government and may be manufactured and used by or for the Government for Government purposes without the payment of any royalties thereon or therefore.

FIELD

The present invention generally relates to pigments, and more specifically, to modification of pigments using atomic layer deposition (ALD) in varying electrical resistivity.

BACKGROUND

Stable white thermal control coatings are used on radiators for a variety of missions. In orbital environments where surface charging occurs, such as polar, geostationary, or gravity-neutral orbits, these coatings must adequately dissipate charge buildup. Most white pigments do not dissipate electrical charge without a dopant or additive. The two most commonly used dissipative thermal coatings (Z93C55 and AZ2000) rely on indium hydroxide or tin oxide as charge dissipative additives.

Work previously conducted at Goddard Space Flight Center (GSFC) sought to encapsulate white coating pigments with indium hydroxide and indium tin oxide (ITO), which is a ternary composition of indium (In), tin (Sn), and oxygen (O) in varying proportions, through sol gel and wet chemistry processing. In these cases, ITO formed locally on a macroscopic scale due to seeding. Thus, ITO crystal formation on the boundaries of the pigment grains and thickness and dispersion throughout the coating were difficult to control, and thicknesses of at least 50-70 nm resulted. Despite improved surface resistivity, the optical properties of the pigment suffered and the resulting coating solar absorptance was higher than the un-doped versions.

Indeed, such charge dissipating additives impact the optical properties and stability of the coating and reduce the efficiency of the thermal design (i.e., reducing reflectance). The end-of-life design properties of the coatings are thus degraded as compared to their un-doped versions, resulting in larger, heavier radiator systems and more complex designs. Accordingly, an improved approach to dissipating charge for thermal control pigments may be beneficial.

SUMMARY

Certain embodiments of the present invention may provide solutions to the problems and needs in the art that have not yet been fully identified, appreciated, or solved by conventional pigment and coating technologies. For example, some embodiments pertain to modification of pigments using atomic layer deposition (ALD) in varying electrical resistivity.

In an embodiment, a method includes loading powdered pigment into a rotating drum and evacuating air from the rotating drum. The method also includes pulsing an indium oxide precursor into the rotating drum, marinating the pigment in the indium oxide precursor for a first time period, and then purging the indium oxide precursor. The method further includes pulsing ozone into the rotating drum, marinating the pigment for in the ozone for a second time period to complete an indium oxide stoichiometry, and then purging the ozone. Additionally, the method includes pulsing a tin oxide precursor into the rotating drum, marinating the pigment in the tin oxide precursor for a third time period, and then purging the tin oxide precursor. The method also includes pulsing ozone into the rotating drum, marinating the pigment for in the ozone for a fourth time period to complete ITO stoichiometry, and then purging the ozone, thereby producing a coated pigment that dissipates charge buildup.

In another embodiment, a method includes pulsing an indium oxide precursor into a rotating drum including a pigment, marinating the pigment in the indium oxide precursor for a first time period, and then purging the indium oxide precursor. The method also includes pulsing ozone into the rotating drum, marinating the pigment for in the ozone for a second time period to complete an indium oxide stoichiometry, and then purging the ozone. The method further includes pulsing a tin oxide precursor into the rotating drum, marinating the pigment in the tin oxide precursor for a third time period, and then purging the tin oxide precursor. Additionally, the method includes pulsing ozone into the rotating drum, marinating the pigment for in the ozone for a fourth time period to complete ITO stoichiometry, and then purging the ozone, thereby producing a coated pigment that dissipates charge buildup.

In yet another embodiment, a method for producing coated powdered pigment includes pulsing trimethyl indium into a rotating drum including a pigment, marinating the pigment in the trimethyl indium for a first time period, and then purging the trimethyl indium. The method also includes pulsing ozone into the rotating drum, marinating the pigment for in the ozone for a second time period to complete an indium oxide stoichiometry, and then purging the ozone. The method further includes pulsing tetrakis(dimethylamino)tin(IV) into the rotating drum, marinating the pigment in the tetrakis(dimethylamino)tin(IV) for a third time period, and then purging the tetrakis(dimethylamino)tin(IV). Additionally, the method includes pulsing ozone into the rotating drum, marinating the pigment for in the ozone for a fourth time period to complete ITO stoichiometry, and then purging the ozone, thereby producing a coated pigment that dissipates charge buildup.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
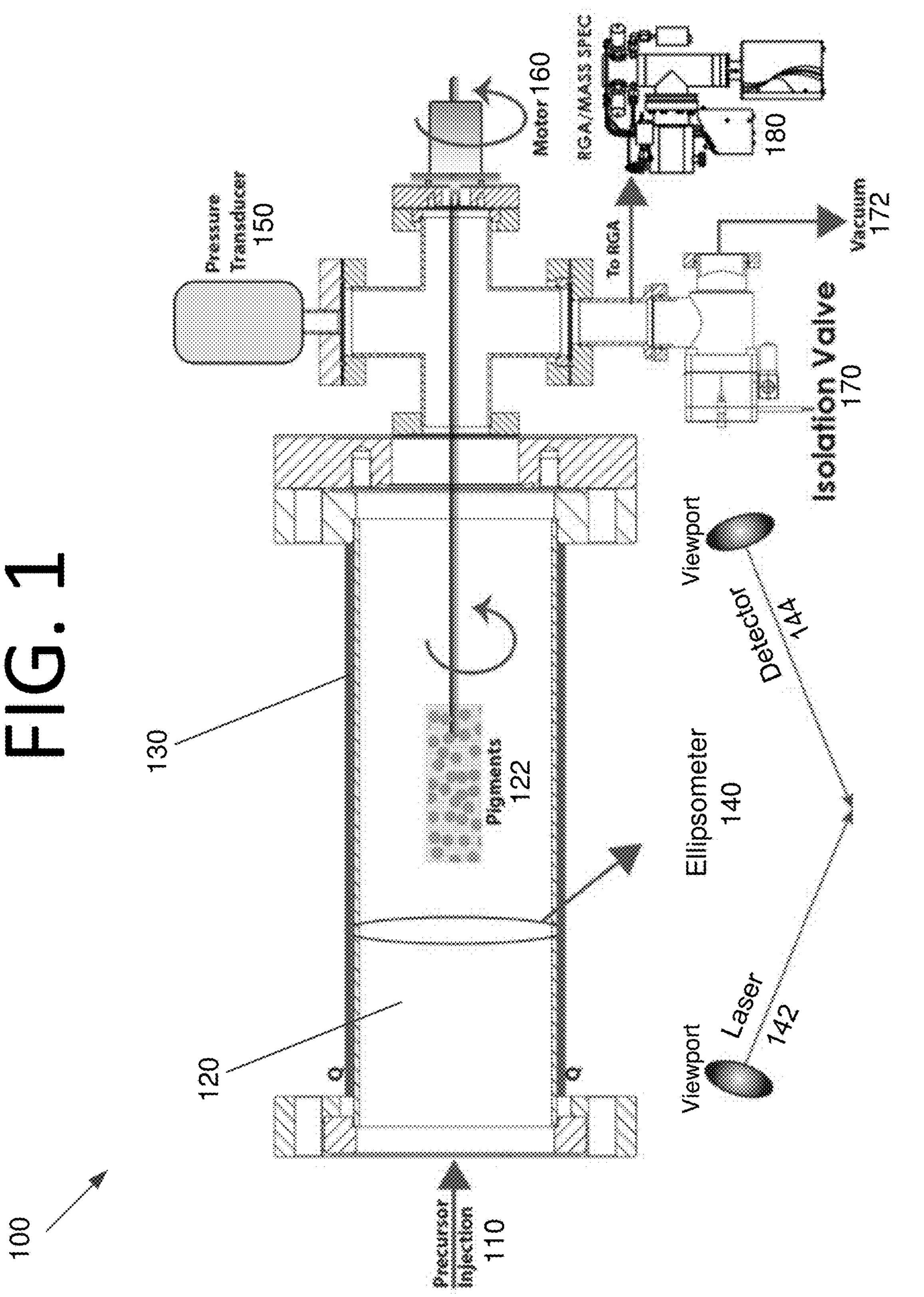
FIG. 1 is a side cutaway view illustrating an ALD reactor, according to an embodiment of the present invention.

Some embodiments of the present invention pertain to modification of pigments using atomic layer deposition (ALD) in varying electrical resistivity. More specifically, in some embodiments, ALD is used to encapsulate pigment particles with controlled thicknesses of a conductive layer, such as ITO. ALD may allow films to be theoretically grown one atom at a time, providing angstrom-level thickness control.

In conventional approaches, only the outer surface of the pigment is coated with a charge dissipating coating in a "post-process" after the pigment coating has been applied. However, pigments are typically silicate coatings and are porous (e.g., Z93 zinc oxide-pigmented potassium silicate coatings). As such, conventional approaches only get the "peaks" of the coating surface and to not get down into the crevices of the coating. However, per the above, charge dissipating coatings in some embodiments are applied to pigment particles as a "pre-process" before the pigment coating is applied.

For certain applications, such as magnetometers and other instruments that are influenced by charge and/or for environments having a high fluence of electrons (such as near Jupiter or the Sun), more charge dissipation may be required and the conductive layer may be thicker. However, for other applications where charge is less of an issue, such as for weather satellites, the conductive coating may be thinner, increasing reflectance. If instruments would be influenced by charge, you want very low resistivity; magnetometers, for instance. Thus, some embodiments enable custom tailoring of the thickness of the charge dissipation layer in order to more effectively meet mission requirements.

ALD is a cost-effective nanomanufacturing technique that allows conformal coating of substrates with atomic control in a benign temperature and pressure environment. Through the introduction of paired precursor gases, thin films can be deposited on a myriad of substrates, such as glass, polymers, aerogels, metals, high aspect ratio geometries, and powders. By providing atomic layer control, where single layers of atoms can be deposited, the fabrication of transparent metal films, precise nanolaminates, and coatings of nanochannels and pores is achievable.

Using ALD to deposit a charge dissipating coating, such as ITO, may have a lower impact on pigment scattering and reflectivity than existing processes due to the reduced thickness of charge dissipating material that can be realized. When used in conjunction with next generation white coatings, which are extremely reflective to shorter wavelength radiation (e.g., ultraviolet), the ALD-deposited charge dissipation approach of some embodiments provide coatings with significantly lower solar absorptance and that are stable than current state-of-the-art coating systems. It is expected that some embodiments will reduce solar loading by greater than 40% with 70% less material than current state-of-the-art technology.

ALD Process

While other pigments may be used without deviating from the scope of the invention, ITO is referred to by way of example below. The process of the depositing ITO via ALD can be separated into two distinct reaction chemistries for the deposition of indium oxide and tin oxide. The growth of indium oxide is carried out utilizing the precursors trimethyl indium and ozone ($O_3$) and the growth of tin oxide is carried out utilizing the precursors tetrakis(dimethylamino)tin(IV) and ozone. The ALD process for both recipes of indium oxide and tin oxide involve distinct pulses of each precursor followed by a purge period in between. The pulse of precursors is accomplished by opening and closing pneumatic valves in some embodiments. The time in between an open and close is called a "pulse." As an example, when depositing indium oxide, a distinct pulse of trimethyl indium is first used, followed by a purge period. Then, a distinct pulse of ozone is applied to complete the indium oxide stoichiometry. A similar process is used for the tin oxide, but instead, a tin oxide precursor is used. By varying the tin oxide pulse sequence, the resistivity of the overall ITO film structure can be controlled. This combination of precursors has never been used before.

More specifically, the "pulse sequence" is the number of pulses. To grow indium oxide, the indium precursor is first pulsed in (and only the indium precursor) for a during of time that can be denoted $t_1$. This is followed by a period of time where the unreacted precursor in the vacuum chamber is purged out, as well as the reacted byproducts of the indium precursor with the surface. This time can be denoted $t_2$. The ozone precursor is then pulsed in for a period of time that can be denoted $t_3$, and this is followed by a second purge, which can be denoted $t_4$, to remove unreacted ozone, as well as any byproducts of the ozone reaction.

A full cycle can be written as $t_1$-$t_2$-$t_3$-$t_4$. The number of times that this cycle is repeated provides increased overall thickness of the film that is grown. This film may be doped with a second material, such as tin, utilizing a similar pulse scheme (i.e., (tin oxide precursor pulse)-(purge)-(ozone pulse)-(purge)) in between the indium oxide cycle. That scheme allows a controlled dopant to be introduced into the film. By varying the number of tin cycles, it is possible to vary (i.e., control) the resistivity of the overall film.

The ALD processes may be carried out in some embodiments utilizing a custom-built ALD reactor. See, e.g., ALD reactor 100 FIG. 1. Reactor 100 may be used to deposit and verify novel materials and precursors, for instance. Precursors 110 are injected into a rotating drum 120 that includes powder pigments 122. Powder pigments 122 are loaded into rotating drum 120 via a hatch (not shown), and rotating drum 120 is then loaded into a vacuum chamber 130. Rotating drum 120 is rotated by a motor 160. An isolation valve 170 (e.g., a gate valve) isolates a vacuum 172 from vacuum chamber 130, and thus also rotating drum 120. Vacuum 172 maintains reduced pressure or vacuum conditions inside vacuum chamber 130 and pumps gases out of rotating drum 120 and vacuum chamber 130 when vacuum 172 is running and isolation valve 170 is open. Isolation valve may be operated such that the pulsed gasses have a resident time within the reactor. In other words, the pulsed gasses are allowed to "marinate" inside the chamber, allowing the pigment particles to be coated.

Commercial reactors typically have preprogrammed recipes that allow for specific material deposition, and some embodiments may also be preprogrammed with desired recipes. The materials that are chosen in conventional ALD systems are typically used in the semiconductor industry, i.e., metal oxides and metals such as alumina, silicon, and hafnium oxide. As such, conventional processes differ significantly from embodiments such as that shown in FIG. 1.

A novel aspect of ALD reactor 100 is the in-situ measurement tools that are used to verify film growth. The multiple in-situ diagnostic and film growth verification tools in this embodiment include at least one upstream pressure transducer 150, an ellipsometer 140 that includes a laser 142 and a detector 144, and a downstream residual gas analyzer (RGA) and mass spectrometer 180. Each of these tools allow for an optimized process to grow films regardless of the state of the precursor, i.e., solid or liquid. Upstream pressure transducer 150 verifies the vapor pressure of each precursor, ellipsometer 140 measures film growth real time, and downstream RGA and mass spectrometer 180 verifies growth chemistries and tracks down any contaminates that may be present. Utilizing these tools, ALD reactor 100 is fundamentally designed to investigate new material systems on novel substrates, such as powders.

The ALD processing may also allow tailorable resistivity systems to meet varying programmatic requirements. Typical surface resistivity requirements can vary between $1\times10^9$ ohms per square to $1\times10^6$ ohms per square, or even less, depending on the orbit and payload requirements. The ALD approach of some embodiments provides control over the deposited thickness of ITO or other charge dissipating coatings onto the pigment particles, which allows selection of the resulting surface resistivity on the pigment. Lower resistivity coating systems can be generated by increasing the thickness of the ITO layer. The percentage of tin in the ITO can dictate resistivity across the pigment or coating, and fine control allows ITO coatings of 20-40 nm in some embodiments.

Figure 2:
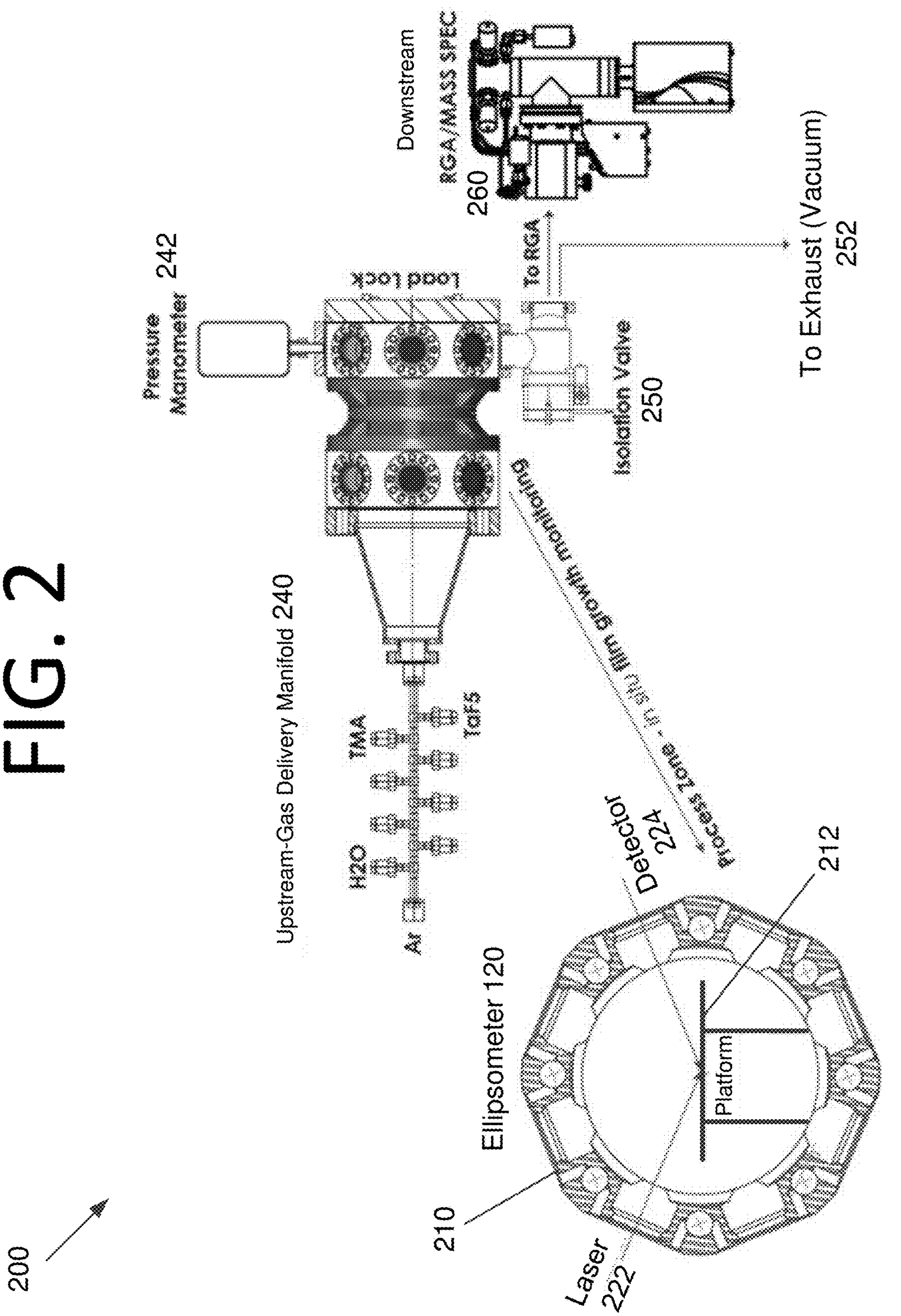
FIG. 2 is an architectural view of an ALD system, according to an embodiment of the present invention.

FIG. 2 is an architectural view of an ALD system 200, according to an embodiment of the present invention. ALD system 200 includes an ALD chamber 210 with a platform on which powdered pigment can be thinly spread. However, this embodiment lacks a rotating drum, such as rotating drum 120 of FIG. 1. As such, powdered pigment may need to be moved/agitated in order to more effectively coat its particles, and the coating process may be less efficient.

Similar to ALD 100 of FIG. 1, ALD system 200 includes an ellipsometer 220 that includes a laser 222 and a detector 224 and a downstream residual gas analyzer (RGA) and mass spectrometer 260. An upstream gas delivery manifold 240 delivers the various gases (and potentially liquids) that may be desired (e.g., Ar, $H_2O$, TMA (please define), tantalum pentafluoride ($TaF_5$), etc.). A pressure manometer 242 measures pressure for gas delivery manifold 240. An isolation valve 250 isolates a vacuum 252 from ALD chamber 210. Vacuum 252 maintains reduced pressure or vacuum conditions inside ALD chamber 210 and pumps gases out of ALD chamber 210 when vacuum 252 is running and isolation valve 250 is open.

Figure 3:
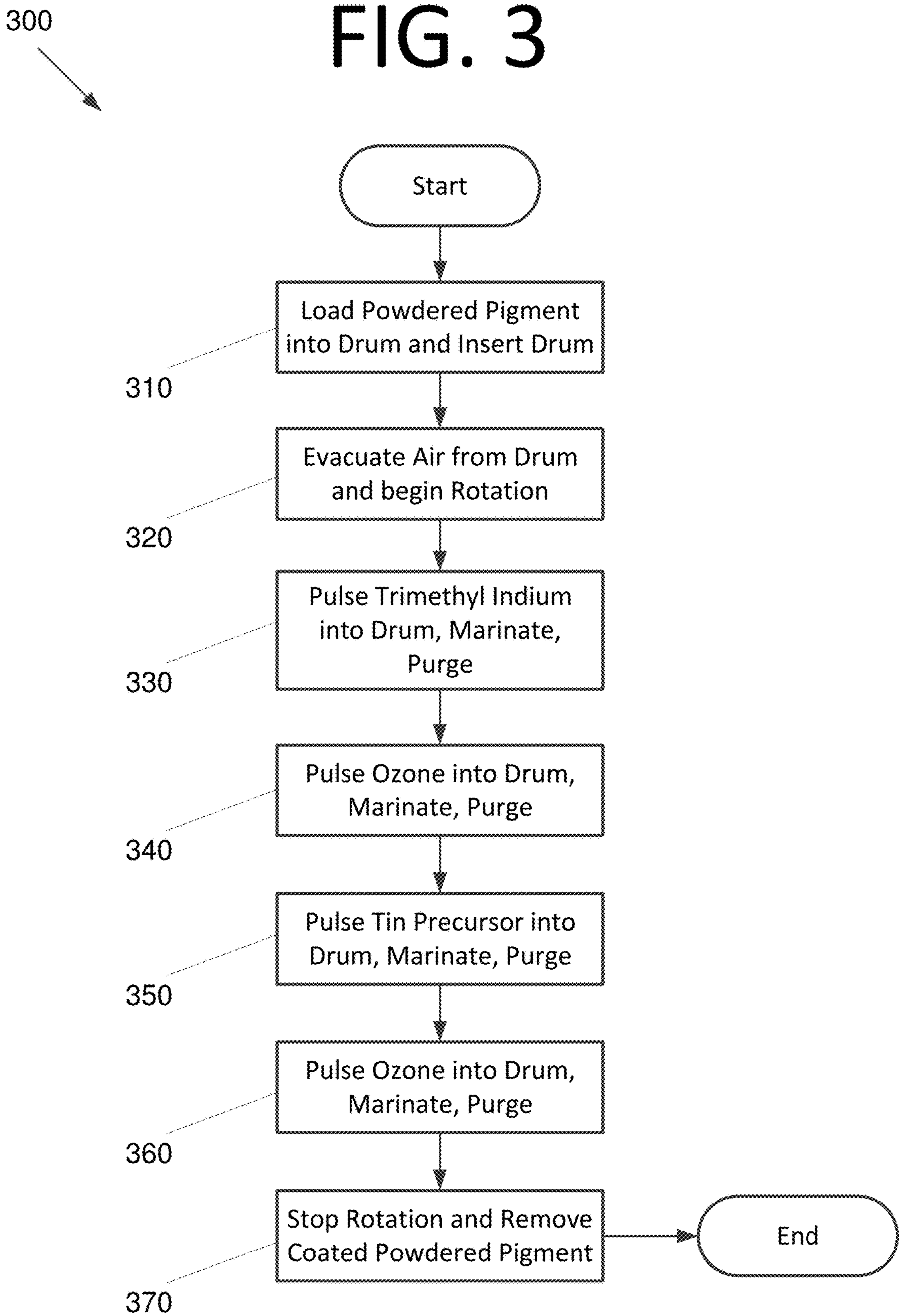
FIG. 3 is a flowchart illustrating a process for applying a charge dissipating coating to pigment particles, according to an embodiment of the present invention.

FIG. 3 is a flowchart illustrating a process 300 for applying ITO to pigment particles, according to an embodiment of the present invention. The process begins with loading powdered pigment, such as a silicate pigment, into a rotating drum, and then loading the rotating drum into a vacuum chamber, at 310. Air is then evacuated from the rotating drum using a vacuum and the drum begins rotation at 320. In some embodiments, the drum may be rotated at varying speeds during the process.

Per the above, recall that there are two distinct reaction chemistries for ITO—one for the deposition of indium oxide and another for the deposition of tin oxide. Trimethyl indium is pulsed into the rotating drum, marinated for a first time period $t_1$, and purged at 330. Ozone is then pulsed into the rotating drum, marinated for a second time period $t_2$ to complete the indium oxide stoichiometry, and purged at 340.

A similar process is used for the tin oxide, but instead, a tin oxide precursor is used. More specifically, tetrakis(dimethylamino)tin(IV) is pulsed into the rotating drum, marinated for a third time period $t_3$, and purged at 350. Ozone is then pulsed into the rotating drum, marinated for a fourth time period $t_4$ to complete the ITO stoichiometry, and purged at 360. In some embodiments, two or more of the first time $t_1$, second time $t_2$, third time $t_3$, and/or fourth time $t_4$ may be the same. By varying the tin oxide pulse sequence, the resistivity of the overall ITO film structure can be controlled. This combination of precursors has never been used before. Drum rotation is then stopped and the now coated powdered pigment is then removed from the rotating drum at 370 and the pigment is ready to be applied as a radiator.

In general terms, how long each pulse is left in the rotating drum, how many pulses are used, and how quickly the drum rotates depends on the chemistries of the substrate (i.e., pigment) and the resultant properties that are desired. In some embodiments, each pulse may be on the order of 1-3 seconds, and the gas may have a residence time in the rotating drum on the order of 20-30 seconds, followed by a 1-minute purge. The rotation speed of the drum may also be pigment-related. In some embodiments, the drum rotates at 30-60 rotations per minute (RPM). However, any pulse length, amount of gas, drum size and shape, residence time in the rotating drum, and/or purge time may be used without deviating from the scope of the invention.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method, comprising:

loading powdered pigment into a rotating drum;

evacuating air from the rotating drum;

pulsing an indium oxide precursor into the rotating drum, marinating the pigment in the indium oxide precursor for a first time period, and then purging the indium oxide precursor;

pulsing ozone into the rotating drum, marinating the pigment in the ozone for a second time period to complete an indium oxide stoichiometry, and then purging the ozone;

pulsing a tin oxide precursor into the rotating drum, marinating the pigment in the tin oxide precursor for a third time period, and then purging the tin oxide precursor; and pulsing ozone into the rotating drum, marinating the pigment in the ozone for a fourth time period to complete an indium tin oxide (ITO) stoichiometry, and then purging the ozone, thereby producing a coated pigment that dissipates charge buildup.

2. The method of claim 1, wherein the pigment comprises a silicate pigment.

3. The method of claim 1, wherein the indium oxide precursor comprises trimethyl indium.

4. The method of claim 1, wherein the tin oxide precursor comprises tetrakis(dimethylamino)tin(IV).

5. The method of claim 1, wherein the rotating drum is rotated at 30 to 60 rotations per minute (RPM).

6. The method of claim 1, wherein each pulse of the indium oxide precursor, the tin oxide precursor, and the ozone is in a range of 1 to 3 seconds.

7. The method of claim 1, wherein the first time period, the second time period, the third time period, and the fourth time period are each in a range of 20 to 30 seconds.

8. The method of claim 1, wherein a rate of rotation of the rotating drum is varied during the process.

9. The method of claim 1, wherein said coated pigment has a thickness in a range of 20 to 40 nanometers (nm).

10. The method of claim 1, wherein a resistivity of the coated pigment is in a range of 1×[(10)] ˆ9 ohms per square to 1×[(10)] ˆ6 ohms per square.

11. A method, comprising:

pulsing an indium oxide precursor into a rotating drum comprising a pigment there within, marinating the pigment in the indium oxide precursor for a first time period, and then purging the indium oxide precursor;

pulsing ozone into the rotating drum, marinating the pigment in the ozone for a second time period to complete an indium oxide stoichiometry, and then purging the ozone;

pulsing a tin oxide precursor into the rotating drum, marinating the pigment in the tin oxide precursor for a third time period, and then purging the tin oxide precursor; and pulsing ozone into the rotating drum, marinating the pigment in the ozone for a fourth time period to complete an indium tin oxide (ITO) stoichiometry, and then purging the ozone, thereby producing a coated pigment that dissipates charge buildup.

12. The method of claim 11, wherein the rotating drum is rotated at 30 to 60 rotations per minute (RPM).

13. The method of claim 11, wherein the indium oxide precursor comprises trimethyl indium.

14. The method of claim 11, wherein the tin oxide precursor comprises tetrakis(dimethylamino)tin(IV).

15. The method of claim 11, wherein each pulse of the indium oxide precursor, the tin oxide precursor, and the ozone is in a range of 1 to 3 seconds.

16. The method of claim 11, wherein the first time period, the second time period, the third time period, and the fourth time period are each in a range of 20 to 30 seconds.

17. A method for producing coated powdered pigment, comprising:

pulsing trimethyl indium into a rotating drum comprising a pigment there within, marinating the pigment in the trimethyl indium for a first time period, and then purging the trimethyl indium;

pulsing ozone into the rotating drum, marinating the pigment in the ozone for a second time period to complete an indium oxide stoichiometry, and then purging the ozone;

pulsing tetrakis(dimethylamino)tin(IV) into the rotating drum, marinating the pigment in the tetrakis(dimethylamino)tin(IV) for a third time period, and then purging the tetrakis(dimethylamino)tin(IV); and pulsing ozone into the rotating drum, marinating the pigment in the ozone for a fourth time period to complete an indium tin oxide (ITO) stoichiometry, and then purging the ozone, thereby producing a coated pigment that dissipates charge buildup.

18. The method of claim 17, further comprising:

rotating the rotating drum at a fixed or variable rate in a range of 30 to 60 rotations per minute (RPM).

19. The method of claim 17, wherein the first time period, the second time period, the third time period, and the fourth time period are each in a range of 20 to 30 seconds.

* * * * *